US012621877B2

(12) United States Patent
Ogata

(10) Patent No.: US 12,621,877 B2
(45) Date of Patent: May 5, 2026

(54) BASE STATION DEVICE, METHOD FOR PROVIDING SERVICE, AND PROGRAM RECORDING MEDIUM WITH PROGRAM RECORDED THEREON

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 535 days.

(21) Appl. No.: 18/015,632

(22) PCT Filed: Jul. 15, 2020

(86) PCT No.: PCT/JP2020/027434
§ 371 (c)(1),
(2) Date: Jan. 11, 2023

(87) PCT Pub. No.: WO2022/013958
PCT Pub. Date: Jan. 20, 2022

(65) Prior Publication Data
US 2023/0254910 A1 Aug. 10, 2023

(51) Int. Cl.
*H04W 76/10* (2018.01)

(52) U.S. Cl.
CPC ................................. *H04W 76/10* (2018.02)

(58) Field of Classification Search
CPC .................................................... H04W 76/10
See application file for complete search history.

(56) References Cited

U.S. PATENT DOCUMENTS

2016/0066333 A1 3/2016 Suzuki et al.

FOREIGN PATENT DOCUMENTS

| JP | 2001-229487 A | 8/2001 |
| JP | 2013-047931 A | 3/2013 |
| JP | 2016066894 A | * 4/2016 |
| JP | 2016-208197 A | 12/2016 |
| JP | 2018-107507 A | 7/2018 |
| WO | 2014/184834 A1 | 11/2014 |
| WO | 2020/111133 A3 | 6/2020 |

OTHER PUBLICATIONS

International Search Report for PCT Application No. PCT/JP2020/027434, mailed on Oct. 20, 2020.
English translation of Written opinion for PCT Application No. PCT/JP2020/027434, mailed on Oct. 20, 2020.
Miyazaki Shinji et al., "Congestion Estimation System Based on Crowd Behavior Analysis Technology", NEC Technical Journal/vol. 67, No. 1, pp. 1-4, [online], [searched on Jun. 1, 2020], Internet <URL:http://jpn.nec.com/techrep/journal/g14/n01/pdf/140117.pdf>.
JP Office Action for JP Application No. 2022-536028, mailed on Mar. 26, 2024 with English Translation.

* cited by examiner

*Primary Examiner* — Elton Williams

(57) ABSTRACT

A base station device according to an aspect of the present disclosure includes: at least one memory configured to store instructions, and at least one processor configured to execute the instructions to: receive a connection request from a terminal, monitor a predetermined area and estimate a state of a transmission source of the connection request, determine whether to allow the connection request from the terminal based on the state of the transmission source, and provide a service to the terminal for which the connection request has been allowed by the determination.

8 Claims, 19 Drawing Sheets

Fig.6

| TRANSMISSION SOURCE | NUMBER OF CONNECTABLE TERMINALS PER TRANSMISSION SOURCE |
|---|---|
| PERSON | 2 |
| VEHICLE | 3 |
| IoT | 1 |
| .. | .. |

Fig.7

| TRANSMISSION SOURCE MANAGEMENT ID | TYPE | TERMINAL ID |
|---|---|---|
| 0001 | PERSON | AAAA,BBBB |
| 0002 | PERSON | CCCC |
| 0011 | VEHICLE | DDDD,EEEE,FFFF |
| 0012 | VEHICLE | GGGG,HHHH |
| 0021 | IoT | IIII |
| .. | .. | .. |

Fig.14

| BASE STATION ID | RU ID | CAMERA ID |
|---|---|---|
| 0001 | 1 | 1 |
| | 2 | 2 |
| | 3 | 3 |
| | 4 | 4 |
| 0002 | 1 | 1 |
| | 2 | 2 |
| .. | .. | .. |

Fig.17

| TRANSMISSION SOURCE | NUMBER OF CONNECTABLE TERMINALS FOR EACH TRANSMISSION SOURCE |
|---|---|
| PERSON | 30 |
| VEHICLE | 20 |
| .. | .. |

Fig.18

| TYPE | ESTIMATED NUMBER | TERMINAL ID |
|---|---|---|
| PERSON | 10 | AAAA,BBBB,CCCC,HHHH,··· |
| VEHICLE | 8 | DDDD,EEEE,FFFF,··· |
| ·· | | ·· |

COMPUTER

9010
CPU

9020
COMMUNICATION INTERFACE

9030
MEMORY

9040
AUXILIARY STORAGE DEVICE

BASE STATION DEVICE, METHOD FOR PROVIDING SERVICE, AND PROGRAM RECORDING MEDIUM WITH PROGRAM RECORDED THEREON

This application is a National Stage Entry of PCT/JP2020/027434 filed on Jul. 15, 2020, the contents of all of which are incorporated herein by reference, in their entirety.

TECHNICAL FIELD

The present disclosure relates to a base station device, a method for providing a service, and a program recording medium with a program recorded on the medium.

BACKGROUND ART

Information is provided to a terminal of a user located in a certain area, or a service is provided based on a request from the terminal. For example, PTL 1 discloses a driving assistance system capable of appropriately providing information regarding traffic to a driver or a vehicle. In addition, PTL 2 discloses a traffic monitoring device in which a camera is attached to a traffic light embedded with a communication device, and information such as traffic volume measurement, traffic violation detection, and accident detection is transmitted to a base station via a communication line.

In the future, in addition to the above-described vehicle, an unmanned aerial vehicle, various transport robots, an Internet of Things (IoT) sensor, and the like will become entities of communication, and it is expected that a proportion thereof will increase.

PTL 3 discloses an imaging device capable of estimating a position of an owner of a portable information terminal and capturing an image or a video of the estimated position without increasing costs and the number of components. In addition, NPL 1 discloses a crowd behavior analysis technology capable of grasping the degree of congestion and a moving direction of a crowd for each area in real time from a video captured by a camera.

CITATION LIST

Patent Literature

[PTL 1] JP 2013-47931 A
[PTL 2] JP 2001-229487 A
[PTL 3] JP 2016-208197 A

Non Patent Literature

[NPL 1] "Congestion Estimation System Based On Crowd Behavior Analysis Technology", NEC Technical Journal/Vol. 67, No. 1, [online], [searched on Jun. 1, 2020], Internet <URL:http://jpn.nec.com/techrep/journal/g14/n01/pdf/140117.pdf>

SUMMARY OF INVENTION

Technical Problem

The following analysis was given by the present inventor. In addition to the in-vehicle terminal and traffic signal described in PTL 1 and PTL 2, various devices are expected to be connected to a network and receive various services in the future.

In addition, the number of communication devices carried by one user also tends to increase. For example, there are not a few users who carry a smartphone and a tablet and use them selectively, and there are an increasing number of people who separately wear a smart watch, a global positioning system (GPS) terminal, a health care terminal, or the like having a communication function.

On the other hand, a base station described in PTL 1 or the like regards one terminal as one communication entity and allocates resources (see, for example, paragraphs 0028 to 0031 and FIG. 3 of PTL 1). As a result, a kind of unfair situation, in which more resources of the base station and the network are allocated to a user or machine having multiple communication terminals than to a user having one communication terminal, and there is a difference in service to be provided, occurs.

An object of the present disclosure is to provide a base station device, a method for providing a service, and a program capable of contributing to the fair allocation of communication resources described above.

Solution to Problem

According to a first aspect, there is provided a base station device including: means configured to receive a connection request from a terminal; means configured to monitor a predetermined area and estimate a state of a transmission source of the connection request; means configured to determine whether to allow the connection request from the terminal based on the state of the transmission source; and means configured to provide a service to the terminal for which the connection request has been allowed by the determination.

According to a second aspect, there is provided a method for providing a service, the method including: receiving a connection request from a terminal; monitoring a predetermined area and estimating a state of a transmission source of the connection request; determining whether to allow the connection request from the terminal based on the state of the transmission source; and providing the service to the terminal for which the connection request has been allowed by the determination. The method is combined with a specific machine called a base station device that provides a service in response to a connection request from a terminal.

According to a third aspect, there is provided a computer program for implementing the functions of the base station device described above. The computer program can be recorded on a computer-readable (non-transitory) storage medium (program recording medium). That is, the present invention can also be embodied as a computer program product.

Advantageous Effects of Invention

According to the present disclosure, it is possible to contribute to fair allocation of communication resources.

BRIEF DESCRIPTION OF DRAWINGS

FIG. 6 is a diagram illustrating an example of a connection allowance policy held by the base station device according to the first example embodiment of the present disclosure.

FIG. 7 is a diagram illustrating an example of a connection management table held by the base station device according to the first example embodiment of the present disclosure.

FIG. 14 is a diagram illustrating an example of base station information held by a control plane function (CPF) according to the second example embodiment of the present disclosure.

FIG. 17 is a diagram illustrating an example of a connection allowance policy held by a base station device according to the third example embodiment of the present disclosure.

FIG. 18 is a diagram illustrating an example of a connection management table held by the base station device according to the third example embodiment of the present disclosure.

FIG. 19 is a diagram illustrating a configuration of a computer that can function as the base station device of the present disclosure.

EXAMPLE EMBODIMENT

Figure 1:
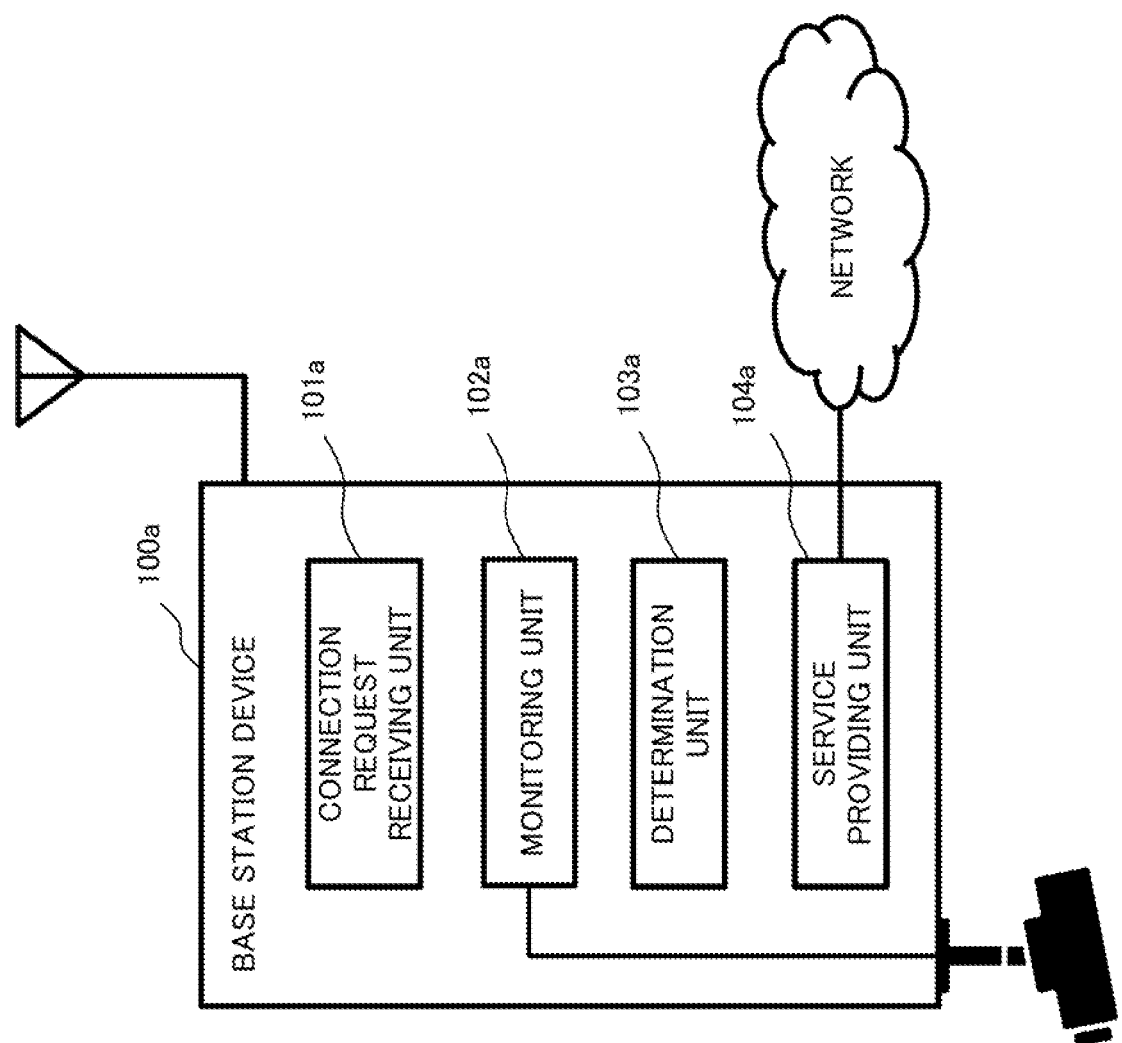
FIG. 1 is a diagram illustrating a configuration according to an example embodiment of the present disclosure.

First, an outline of an example embodiment of the present disclosure will be described with reference to the drawings. Note that reference numerals in the drawings for this outline denote elements for convenience as an example for assisting understanding, and are not intended to limit the present disclosure to the illustrated aspects. In addition, connection lines between blocks in the drawings and the like referred to in the following description include both bidirectional lines and unidirectional lines. A unidirectional arrow schematically indicates a main flow of a signal (data), and does not exclude bidirectionality. Although there are ports and interfaces at connection points of input and output of each block in the drawings, they are not illustrated. In the following description, "A and/or B" is used to mean at least one of A or B.

An example embodiment of the present disclosure can be implemented by a base station device 100*a* including a connection request receiving unit 101*a*, a monitoring unit 102*a*, a determination unit 103*a*, and a service providing unit 104*a* as illustrated in FIG. 1.

The connection request receiving unit 101*a* functions as means configured to receive a connection request from a terminal.

The monitoring unit 102*a* functions as means configured to monitor a predetermined area and estimate a state of a transmission source of the connection request.

The determination unit 103*a* functions as means configured to determine whether to allow the connection request from the terminal according to whether the number of transmission sources is consistent with the connection request from the terminal.

The service providing unit 104*a* functions as means configured to provide a service to the terminal for which the connection request has been allowed by the determination.

Once a connection request is received from a terminal, the base station device 100*a* including the above components estimates a state of a transmission source of the connection request. Then, the base station device 100*a* determines whether to allow the connection request from the terminal based on the state of the transmission source.

Figure 2:
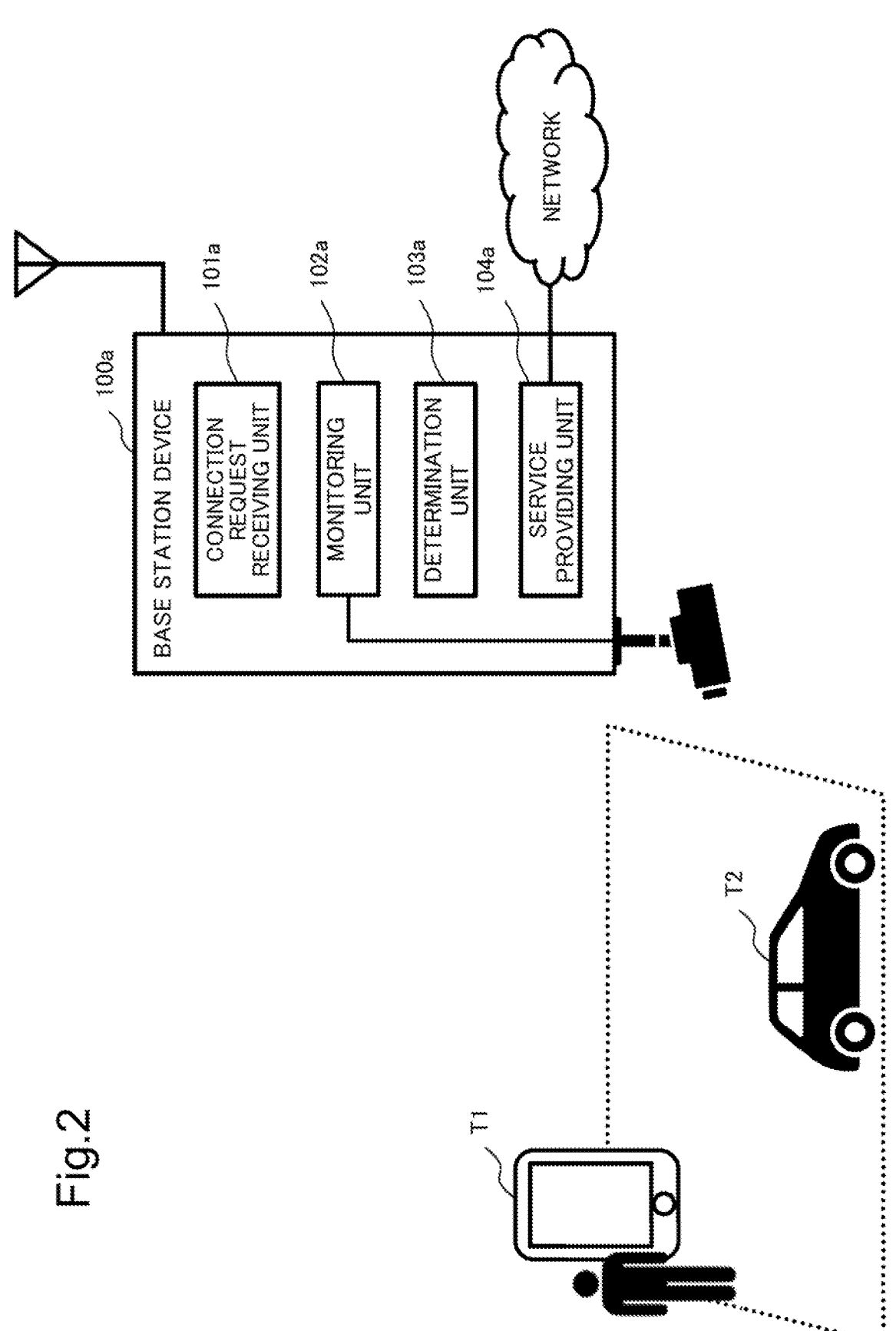
FIG. 2 is a diagram for describing an operation according to an example embodiment of the present disclosure.

For example, as illustrated in FIG. 2, when a connection request is received from a terminal T1 of a pedestrian located in a predetermined area indicated by a dotted line, the base station device 100*a* specifies the pedestrian as a transmission source. Then, the base station device 100*a* allows the connection request from the terminal T1 since the two are in a one-to-one relationship and consistent with each other. Similarly, when a connection request is received from an in-vehicle terminal T2, the base station device 100*a* specifies the vehicle as a transmission source. Then, the base station device 100*a* allows the connection request from the terminal T2 since the two are in a one-to-one relationship and consistent with each other.

Figure 3:
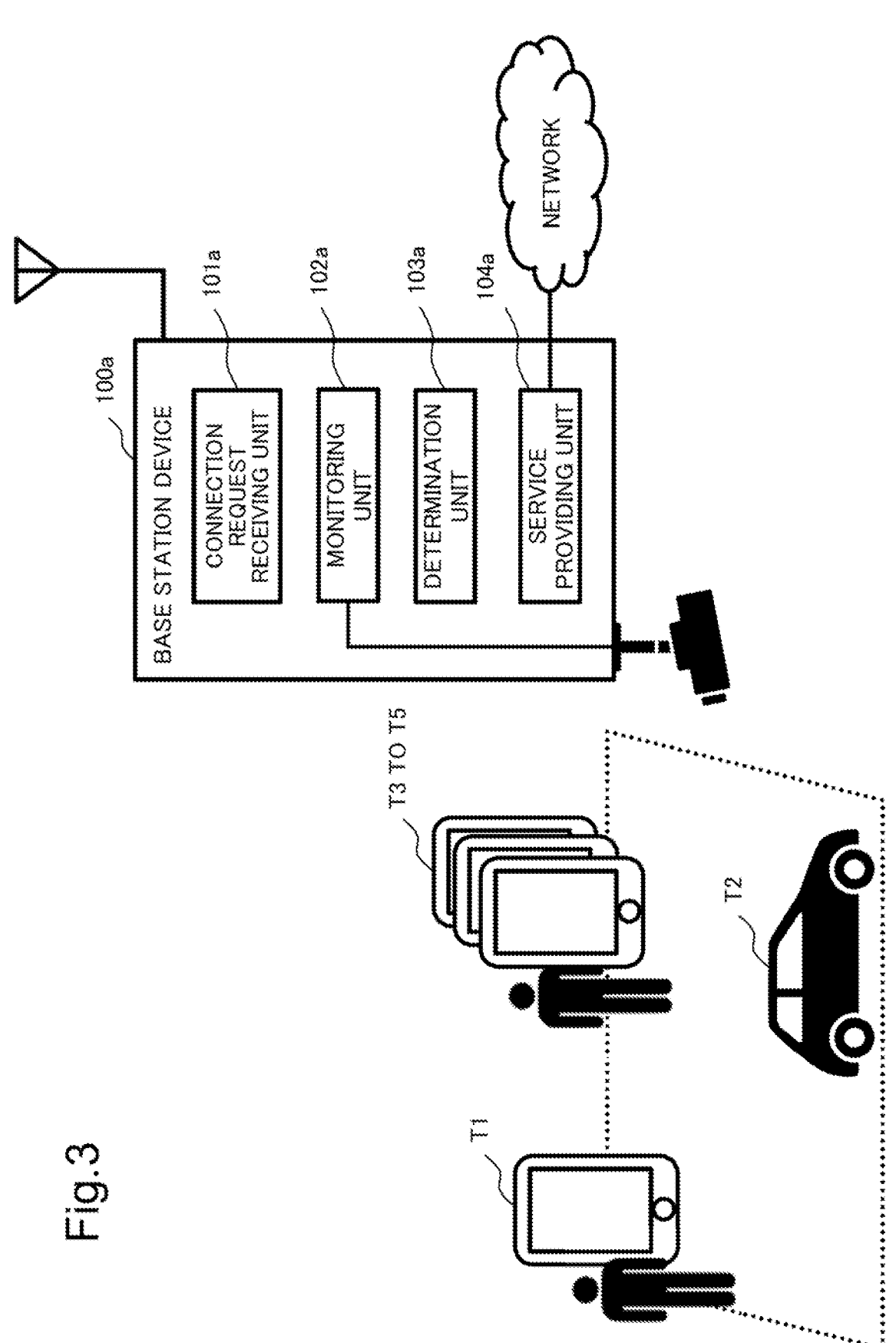
FIG. 3 is a diagram for describing an operation according to an example embodiment of the present disclosure.

Thereafter, as illustrated in FIG. 3, it is assumed that a pedestrian carrying three terminals T3 to T5 enters a predetermined area, and the terminals T3, T4, and T5 transmit connection requests to the base station device 100*a* in this order. In this case, the base station device 100*a* allows the connection request from the terminal T3 because the connection request from the terminal T3 is in a one-to-one relationship with and consistent with the pedestrian as the transmission source. On the other hand, for the connection requests from the terminals T4 and T5, since there is no transmission source other than the pedestrian to whom the service is being provided, the base station device 100*a* determines that it is not consistent anymore and rejects the connection requests from the terminals T4 and T5.

As described above, the base station device 100*a* estimates the state of the transmission source instead of the state of the terminal, checks the matching property, allows the connection request, and provides the service. As a result, it is possible to fairly allocate communication resources to the transmission source.

In the example of FIG. 3, whether to allow a connection request is determined based on whether a transmission source and the connection request are in a one-to-one relationship. However, the transmission source and the connection request are not necessarily in a one-to-one relationship. For example, a predetermined number of connection requests may be allowed for one transmission source (a pedestrian, a vehicle, or an IoT device). For example, in a case where a rule for allowing two connection requests is defined for one transmission source (a pedestrian, a vehicle, or an IoT device), in the example of FIG. 3, the base station device 100a allows the connection requests from the terminal T3 and the terminal T4. In this case, the base station device 100a rejects the connection request from the terminal T5.

Figure 4:
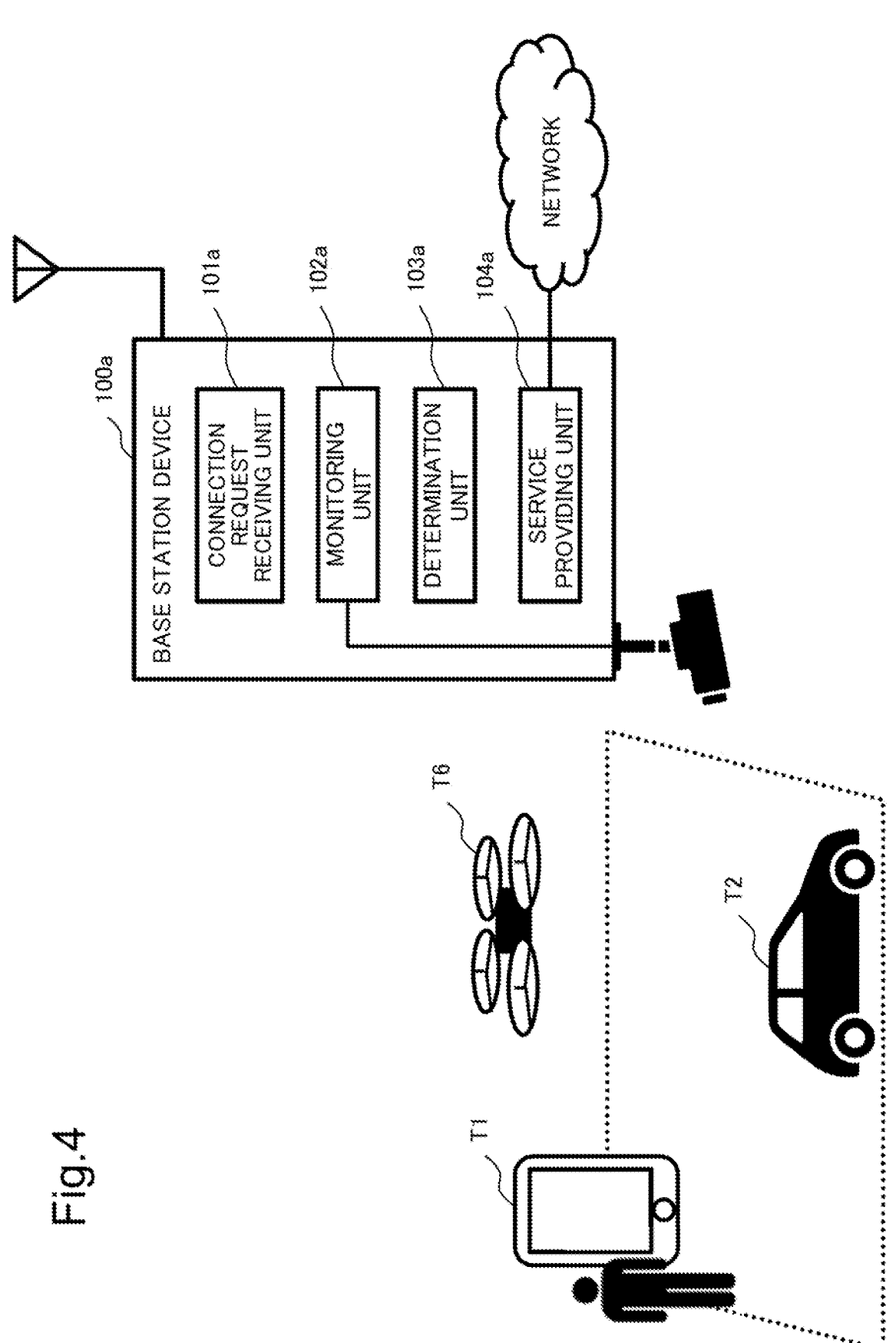
FIG. 4 is a diagram for describing an operation according to an example embodiment of the present disclosure.

On the other hand, a case where a connection request is received but a transmission source of the connection request cannot be specified, or a case where it is determined that a device as a transmission source is a device that is not a service target is also assumed. For example, as illustrated in FIG. 4, in a case where there is a connection request from a terminal T6 mounted on an unmanned aerial vehicle (UAV), an image of the unmanned aerial vehicle or the terminal T6 cannot be captured, and the transmission source thus cannot be specified, the connection request from the terminal T6 may be rejected. In a case where the image of the terminal T6 can be specified but it can be confirmed that the unmanned aerial vehicle (UAV) as the transmission source is a device that is not a service target, the connection request from the terminal T6 may be rejected. It is a matter of course that in a case where the unmanned aerial vehicle (UAV) is also a service target device, the connection request from the terminal T6 may be allowed similarly to T1 and T2 described above.

First Example Embodiment

Figure 5:
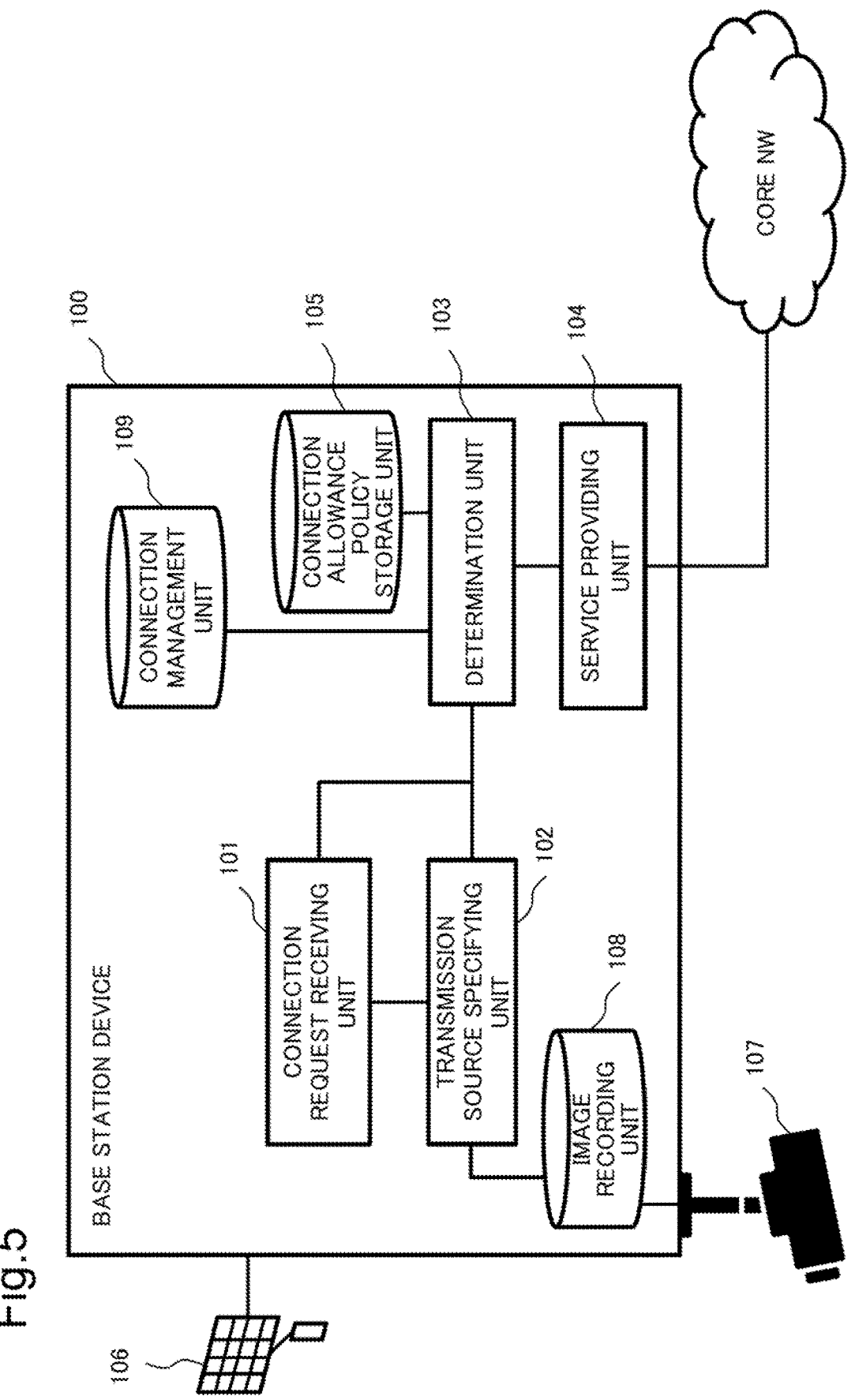
FIG. 5 is a block diagram illustrating a configuration of a base station device according to a first example embodiment of the present disclosure.

Next, a first example embodiment of the present disclosure will be described in detail with reference to the drawings. FIG. 5 is a block diagram illustrating a configuration of a base station device according to the first example embodiment of the present disclosure. FIG. 5 illustrates a base station device 100 including a connection request receiving unit 101, a transmission source specifying unit 102, a determination unit 103, a service providing unit 104, a connection allowance policy storage unit 105, an antenna 106, a camera 107, an image recording unit 108, and a connection management unit 109. As such a base station device 100, a base station of a 5th generation mobile communication system (5G) standardized by 3rd generation partnership project (3GPP) can be used.

When a connection request is received from a terminal located in a service area of the base station device 100 via the antenna 106, the connection request receiving unit 101 requests the determination unit 103 to determine whether to receive the connection request.

In response to a request from the determination unit 103, the transmission source specifying unit 102 specifies a transmission source that has made the connection request from an image captured by the camera 107. As a method of specifying the transmission source, it is possible to adopt a method of performing frame subtraction for the latest image and an image before receiving the connection request by using data recorded in the image recording unit 108 and specifying the transmission source from a feature of an image appearing in a difference image. In addition, whether the image appearing in the difference image (a change in a figure) is the transmission source, the type (a pedestrian, a vehicle, or an IoT device), and the like can be identified using a trained model prepared in advance. For the pedestrian, the vehicle, and the IoT device, a subdivided subject type and the like may be identified. For example, an emergency vehicle, a prioritized bus, or a general vehicle may be identified for the vehicle, and an unmanned transport vehicle, a robot, an UAV, or the like may be identified for the IoT device.

The determination unit 103 determines whether to allow a connection request from a terminal based on a connection allowance policy stored in the connection allowance policy storage unit 105.

FIG. 6 illustrates an example of the connection allowance policy stored in the connection allowance policy storage unit 105. In the example of FIG. 6, the connection allowance policy in which the number of terminals allowed to be simultaneously connected (simultaneous-connection-allowed number) is determined for each transmission source of a connection request (connection request source) is illustrated. In a case where a transmission source specified by the transmission source specifying unit 102 is "person" (pedestrian), the determination unit 103 allows connection requests from up to two terminals. Similarly, in a case where a transmission source specified by the transmission source specifying unit 102 is "vehicle", the determination unit 103 allows connection requests from up to three terminals. Similarly, in a case where a transmission source specified by the transmission source specifying unit 102 is "IoT device", the determination unit 103 allows a connection request from one terminal at the same time. As the number of connection requests allowed for each transmission source varies in this manner, it is possible to allocate resources according to the type of a transmission source of a connection request. It is a matter of course that the simultaneous-connection-allowed number illustrated in FIG. 6 is merely an example, and can vary depending on a capability of the base station device 100, a size or position of an area in which a service can be provided, and the like.

The number of terminals allowed to be simultaneously connected (simultaneous-connection-allowed number) is set for each large classification category such as a person, a vehicle, or an IoT device in the example of the connection allowance policy in FIG. 6, but the number of terminals allowed to be simultaneously connected (simultaneous-connection-allowed number) may be set for each subdivided type. For example, the number of terminals allowed to be simultaneously connected (simultaneous-connection-allowed number) to each of an emergency vehicle, a prioritized bus, and a general vehicle may be set for the vehicle. Similarly, the number of terminals allowed to be simultaneously connected (simultaneous-connection-allowed number) to each of an unmanned transport vehicle, a robot, and an UAV may be set for the IoT device.

The service providing unit 104 provides a service to a terminal for which a connection request has been allowed by the determination performed by the determination unit 103. Specifically, the service providing unit 104 allows a terminal for which a connection request has been allowed to provide various types of information and upload data via a core network (core NW).

The camera 107 is arranged in such a way as to be capable of capturing an image of a service target area of the base station device 100, and records the captured image in the image recording unit 108. A plurality of cameras 107 may be arranged as necessary.

The connection management unit 109 manages, for each transmission source, a type of a transmission source and a terminal being connected. FIG. 7 is a diagram illustrating an example of a connection management table held by the connection management unit 109. The example of FIG. 7 illustrates a table that enables management of a transmission source management ID for uniquely specifying a transmission source specified by the transmission source specifying unit 102, a type of the transmission source, and a terminal ID being connected in association with one another. For example, in a case where "person" as a transmission source is newly recognized, the connection management unit 109 assigns a transmission source management ID 0001 and adds a new entry to the connection management table. Then, the connection management unit 109 adds a terminal ID to the corresponding entry according to the determination result of the determination unit 103 and, thus, an association between the transmission source and a terminal allowed to be connected is managed. For example, in the example of FIG. 7, the transmission source to which the transmission source management ID 0001 is assigned is "person", and terminals having terminal IDs of AAAA and BBBB are being connected. In this case, since the transmission source having the transmission source management ID 0001 is "person", an upper limit of the number of connectable terminals is reached according to the connection allowance policy of FIG. 6. On the other hand, since a transmission source having a transmission source management ID 0002 is "person" and only a terminal having a terminal ID of CCCC is being connected, another terminal can be connected within a range specified as the same transmission source.

As the base station device 100 having the above-described camera function and service providing function, a base station device arranged at an intersection and having a function of recording images inside and outside the intersection by a camera can also be used. Hereinafter, an operation of the base station device 100 will be described in detail using an example in which the base station device 100 is arranged at an intersection and provides a communication service to a vehicle or pedestrian passing through the intersection.

Figure 8:
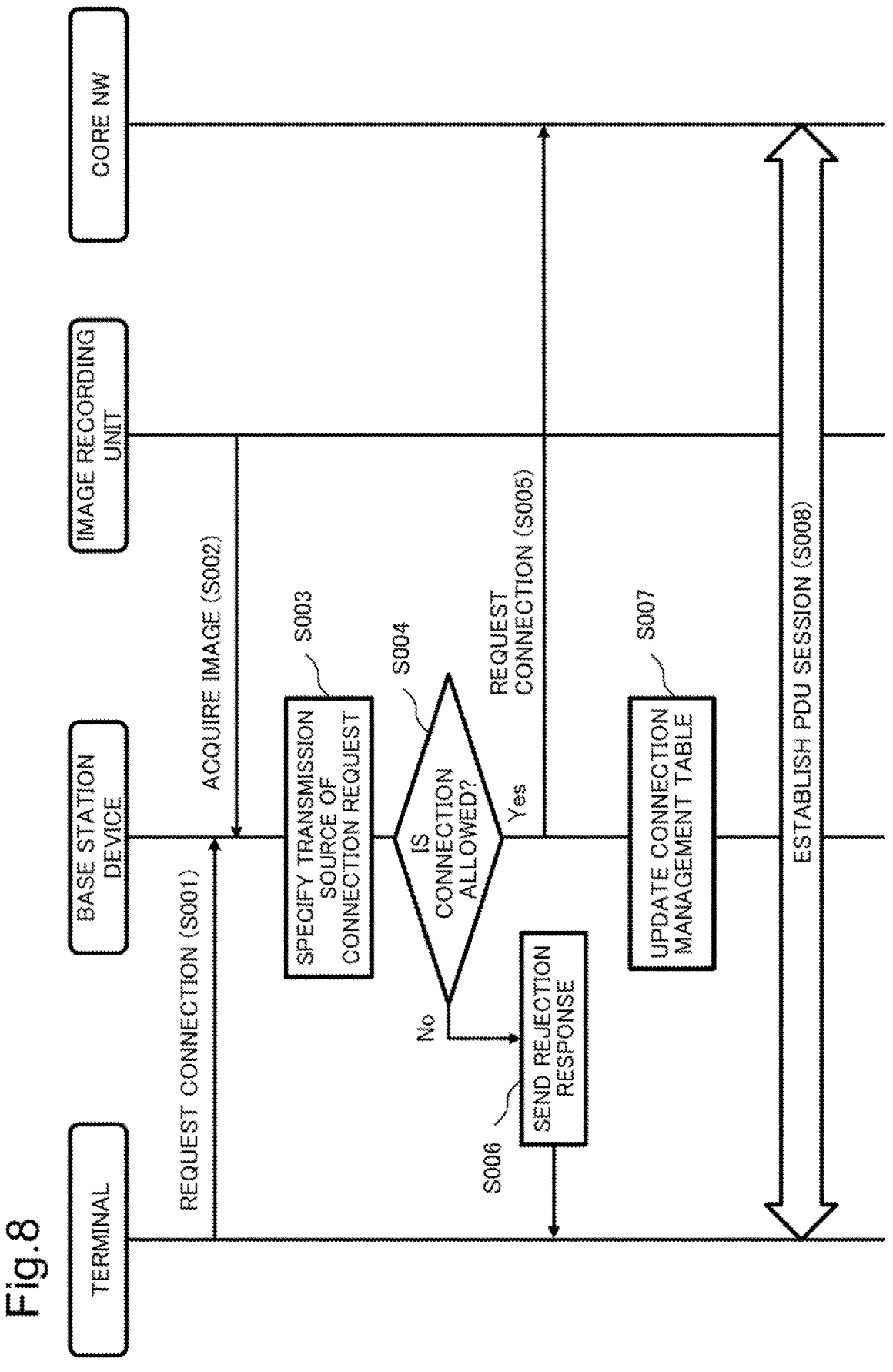
FIG. 8 is a sequence diagram illustrating an operation according to the first example embodiment of the present disclosure.

FIG. 8 is a sequence diagram illustrating an operation according to the first example embodiment of the present disclosure. Referring to FIG. 8, first, when a connection request is received from a terminal (Step S001), the base station device 100 acquires an image from the image recording unit 108 (Step S002), and specifies a transmission source (Step S003).

Next, the base station device 100 determines whether to allow the connection request with reference to a connection allowance policy and a connection management table held by the connection management unit 109 (Step S004). For example, in a case where there is a connection request from a transmission source determined as "vehicle" by the transmission source specifying unit 102, the base station device 100 allows connection if the number of connected terminals of the corresponding transmission source has not reached an upper limit defined in the connection allowance policy (Yes in Step S004). In this case, the base station device 100 transfers the connection request to the core NW (Step S005). The base station device 100 adds a terminal ID for which connection has been allowed to the connection management table of the connection management unit 109 (Step S007). Thereafter, a protocol data unit (PDU) session is established between the terminal and the core NW, and a service is started (Step S008).

On the other hand, in a case where the number of connected terminals of the corresponding transmission source has reached the upper limit defined in the connection allowance policy, the base station device 100 rejects connection (No in Step S004). In this case, the base station device 100 transmits a rejection response to the terminal (Step S006).

Thereafter, similarly, the base station device 100 updates a content of the connection management unit 109, and performs the above-described operation every time a connection request is received to determine whether to allow the connection request. As a result, allocation of base station resources based on not the number of terminals but the transmission source is implemented.

Figure 9:
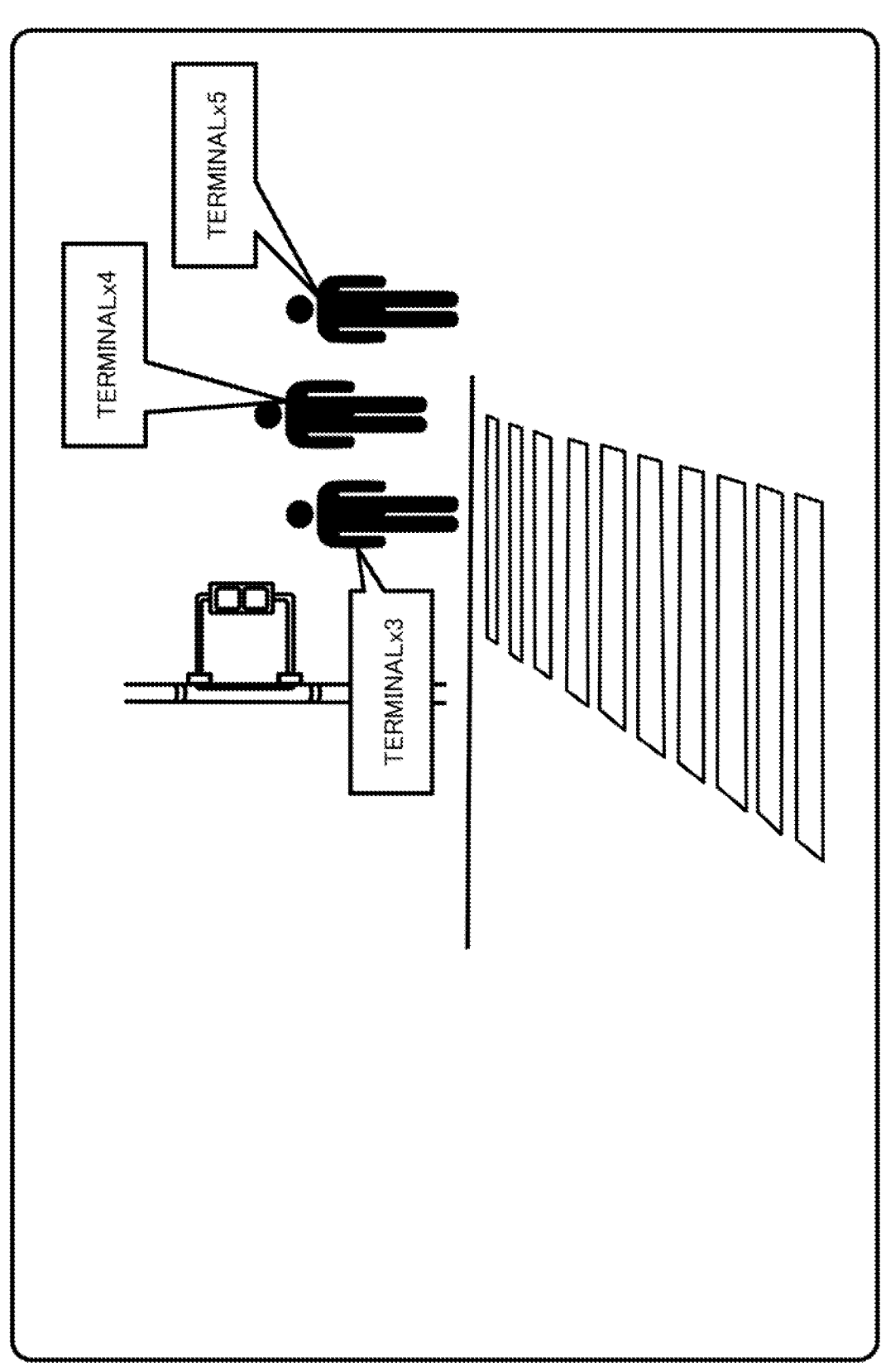
FIG. 9 is a diagram for describing an operation of the base station device according to the first example embodiment of the present disclosure.

Effects of the present example embodiment will be described in detail with reference to FIGS. 9 to 12. FIG. 9 illustrates pedestrians waiting for a signal to change in front of a crosswalk at an intersection and the number of terminals possessed by the pedestrians. It is considered that a base station device is installed near the intersection and a communication service is provided. When connection requests are received from the terminals and all of the connection requests are allowed, the base station device accommodates a total of 12 terminals and provides the service.

Figure 10:
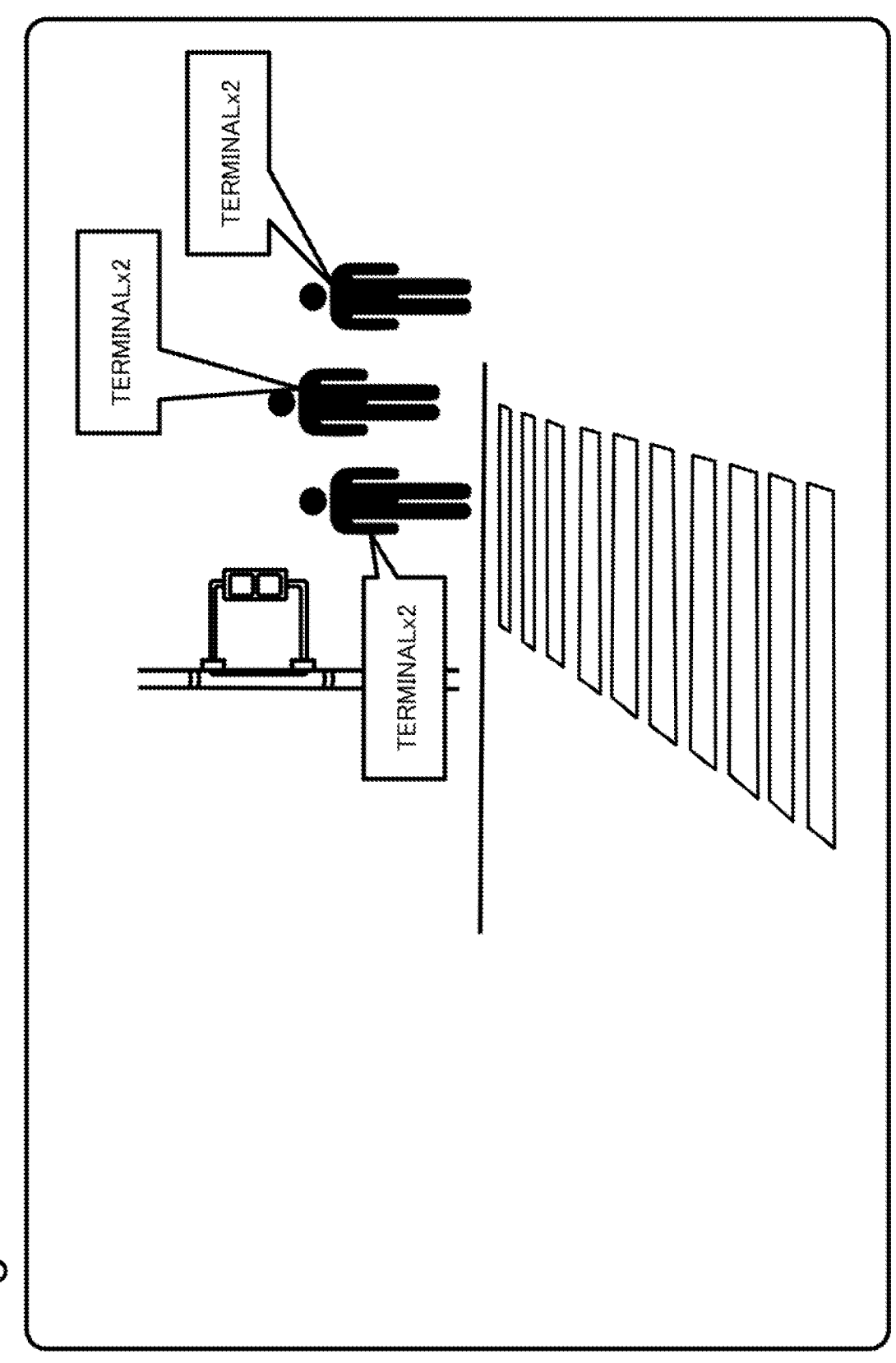
FIG. 10 is a diagram for describing an operation of the base station device according to the first example embodiment of the present disclosure.

FIG. 10 illustrates an example in which the number of connectable terminals per transmission source is set to two by using the base station device 100 according to the present example embodiment. As illustrated in FIG. 10, with the base station device 100 according to the present example embodiment, the number of connectable terminals for one pedestrian can be limited to two. As a result, resources of the base station device 100 can be saved for pedestrians entering the intersection in the future, and fairness between pedestrians can be secured. According to the present example embodiment, since the number of transmission sources can be grasped instead of the number of terminals, it is also possible to correctly grasp the number of pedestrians waiting for a signal to change at this crosswalk as three. The number of transmission sources accurately grasped in this way can also be used, for example, to grasp the number of pedestrians staying in a sidewalk area of the intersection.

Figure 11:
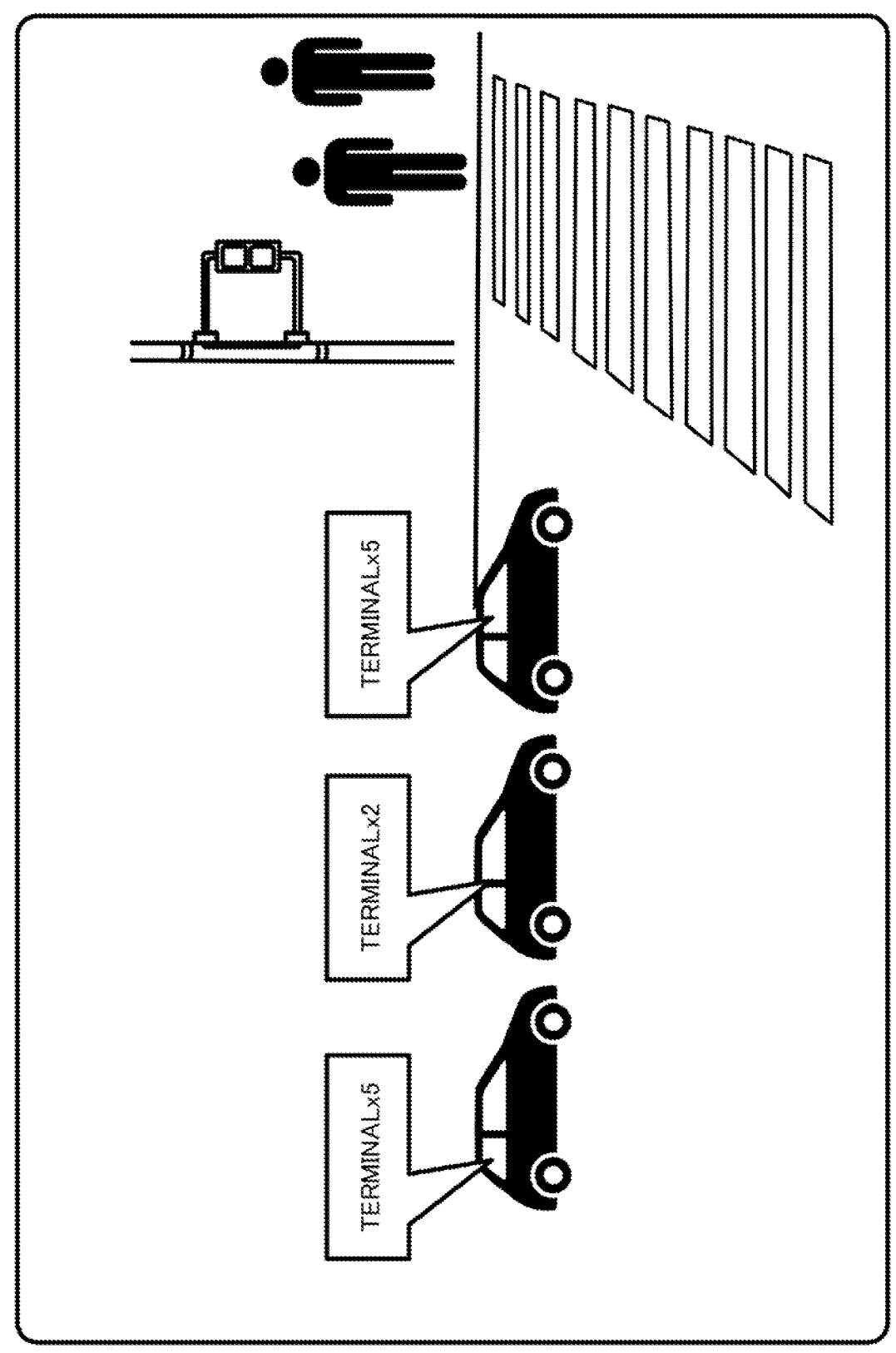
FIG. 11 is another diagram for describing the operation of the base station device according to the first example embodiment of the present disclosure.

FIG. 11 illustrates vehicles waiting for a signal to change in front of a crosswalk at an intersection and the number of terminals mounted on each vehicle. It is considered that a base station device is installed near the intersection and a communication service is provided. When connection requests are received from the terminals and all of the connection requests are allowed, the base station device accommodates a total of 12 terminals and provides the service.

Figure 12:
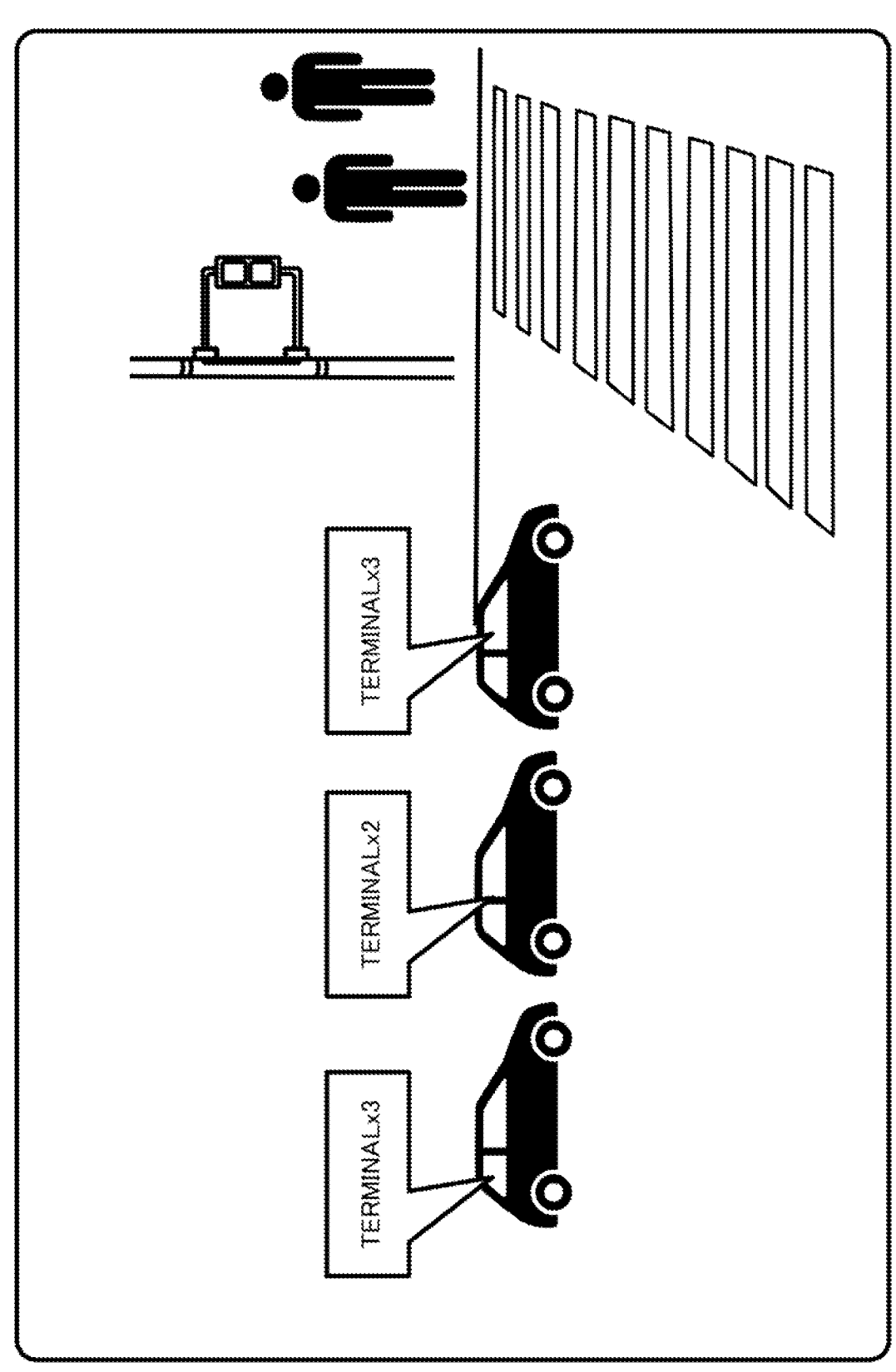
FIG. 12 is another diagram for describing the operation of the base station device according to the first example embodiment of the present disclosure.

FIG. 12 illustrates an example in which the number of connectable terminals per transmission source is set to three by using the base station device 100 according to the present example embodiment. As illustrated in FIG. 12, with the base station device 100 according to the present example embodiment, the maximum number of connectable terminals for one vehicle can be limited to three. In addition, the number of terminals accommodated by the base station device 100 is also reduced to eight from 12 in FIG. 11. As a result, resources of the base station device 100 can be saved for vehicles and the like entering the intersection in the future, and fairness between vehicles can be secured. According to the present example embodiment, since the number of transmission sources can be grasped instead of the number of terminals, it is also possible to correctly grasp the number of vehicles waiting for a signal to change at this crosswalk as three. The number of transmission sources accurately grasped in this way can also be used, for example, to grasp the number of vehicles waiting for a signal to change at the intersection.

As described above, according to the present example embodiment, it is possible to allocate resources of the base station device based on the type and number of transmission sources, not the number of terminals. Such an operation according to the present example embodiment is effective as a countermeasure against an attack or a deception act that uses a large number of terminals with a malicious intention and requests connection.

Second Example Embodiment

The base station device determines whether to allow a connection request based on the type and number of transmission sources in the first example embodiment described above, but equivalent functions may be arranged on a network side. Next, a second example embodiment in which a connection request processing function is arranged on a core network side managed by an electronic communication carrier will be described in detail with reference to the drawings. In the following description, an example in which the same functions are provided in a core network of a 5th generation mobile communication system (5G) standardized by 3GPP will be described.

Figure 13:
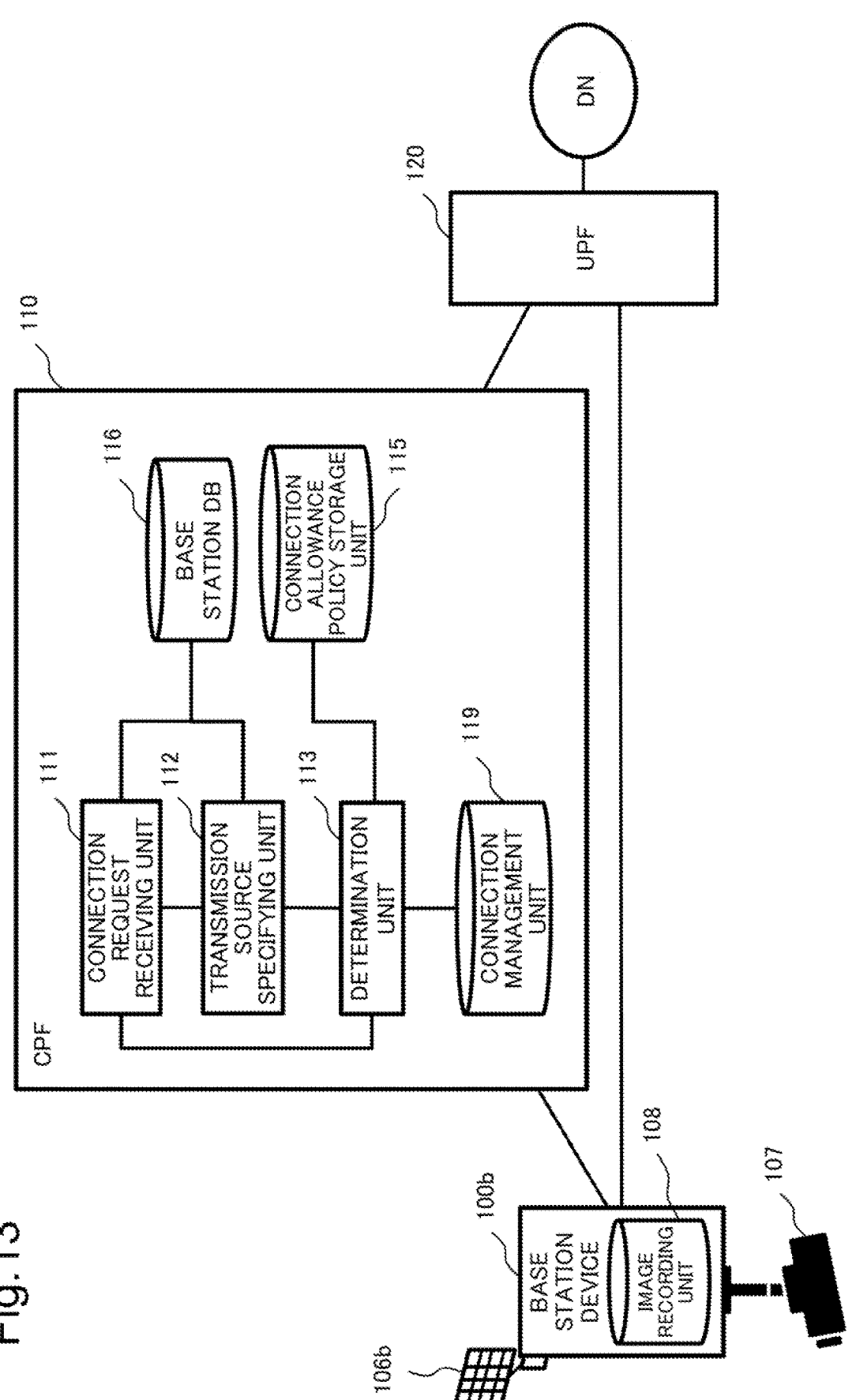
FIG. 13 is a block diagram illustrating a configuration according to a second example embodiment of the present disclosure.

FIG. 13 is a block diagram illustrating a configuration according to the second example embodiment of the present disclosure. FIG. 5 illustrates a configuration in which a CPF 110 and a UPF 120 which are elements of the core network are connected to a base station device 100b. In the present example embodiment, the CPF 110 has a function of determining whether to allow a connection request based on the type and number based on the number of transmission sources of the connection request. The CPF in FIG. 13 is an abbreviation for control plane function and the UPF in FIG. 13 is an abbreviation for user plane function. Such a CPF and UPF can be implemented as virtual network functions (VNF) by various orchestration devices in addition to physical devices. A DN illustrated in FIG. 13 is an abbreviation of data network, and represents the Internet, a cloud, or the like connected to the core network.

The base station device 100b is a base station device including a radio unit (RU) 106b, a camera 107, and an image recording unit 108. Since a configuration of each unit of the base station device 100b is the same as that of the element of the first example embodiment denoted by the same reference numeral, a description of the configuration will be omitted.

The UPF 120 is a functional unit responsible for transferring user data in a control plane-user plane separation (CU separation) configuration.

The CPF 110 is a functional unit responsible for control processing for implementing communication in the control plane-user plane separation (CU separation) configuration. According to the present example embodiment, the following functional units are added to the CPF 110.

When a connection request is received from a terminal located in a service area of the base station device 100b via the base station device 100b, a connection request receiving unit 111 requests a determination unit 113 to determine whether to receive the connection request.

In response to a request from the determination unit 113, a transmission source specifying unit 112 specifies a transmission source that has made the connection request with reference to an image accumulated in the image recording unit 108 of the base station device 100b. The image for specifying the transmission source can be selected with reference to base station information registered in a base station database (base station DB) 116. As a method of specifying the transmission source, a method similar to that in the first example embodiment can be adopted. That is, the transmission source specifying unit 112 functions as means configured to specify a transmission source of a connection request from a figure in an area associated to a base station device that has received the connection request.

FIG. 14 is a diagram illustrating an example of the base station information held in the base station database (base station DB) 116. The example of FIG. 14 illustrates base station information in which an ID of each base station device (base station ID), an ID of an antenna (RU) of each base station device (RU ID/antenna ID), and a camera ID are recorded in association with one another. The transmission source specifying unit 112 described above infers the camera ID from a combination of the base station ID and the RU ID for the transmission source of the connection request. Then, the transmission source specifying unit 112 specifies the transmission source with reference to an image having the corresponding camera ID from the image recording unit 108.

The determination unit 113 determines whether to allow a connection request from a terminal based on a connection allowance policy stored in a connection allowance policy storage unit 115. Since the determination unit 113, the connection allowance policy storage unit 115, and a connection management unit 119 are similar to the determination unit 103, the connection allowance policy storage unit 105, and the connection management unit 109 of the base station device 100 according to the first example embodiment, respectively, a description of these components will be omitted.

The camera 107 is arranged in such a way as to be capable of capturing an image of an area covered by each RU 106 connected to the base station device 100b, and records the captured image in the image recording unit 108 in association with the base station ID and the RU ID.

Figure 15:
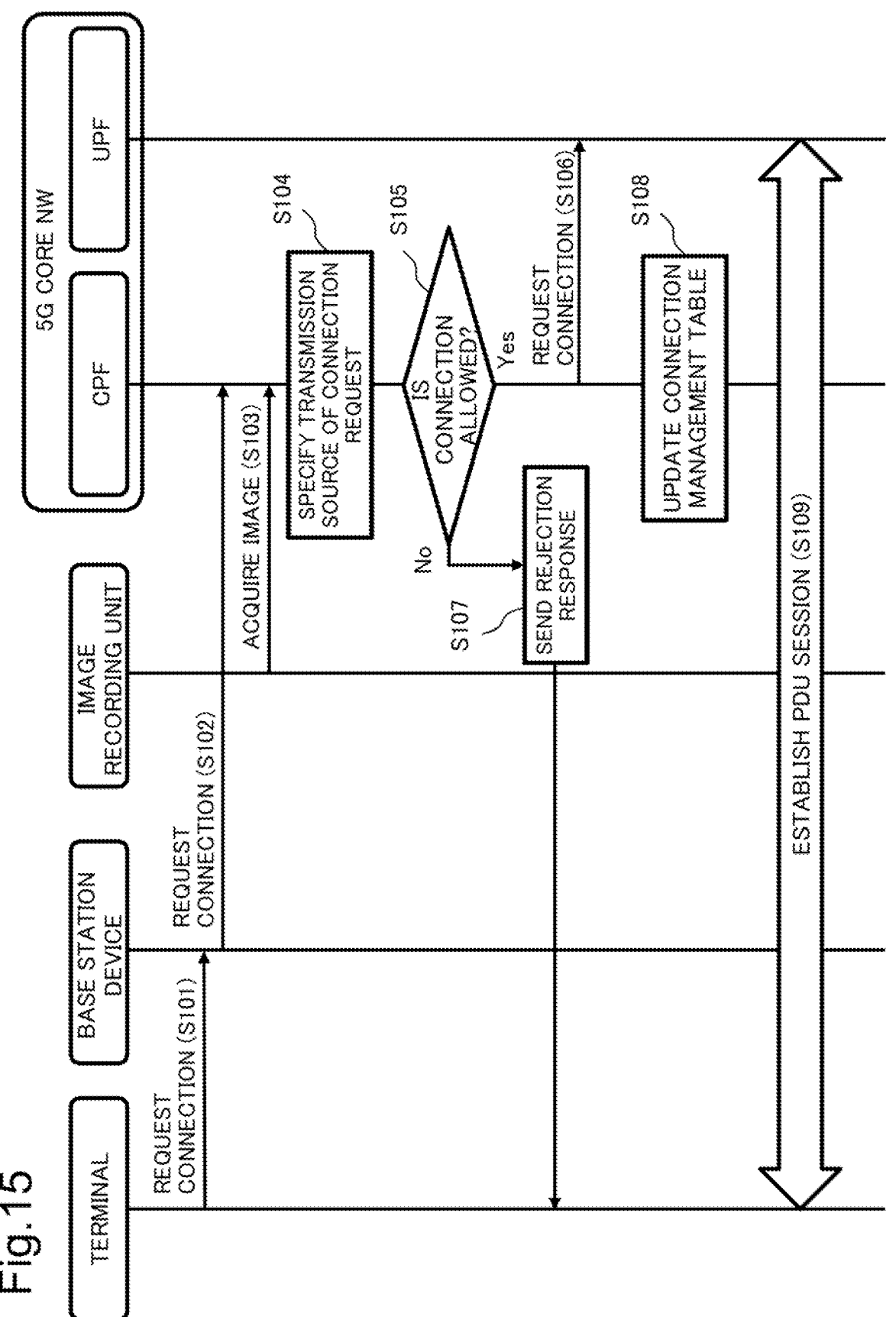
FIG. 15 is a sequence diagram illustrating an operation according to the second example embodiment of the present disclosure.

Next, an operation according to the present example embodiment will be described in detail with reference to the drawings. FIG. 15 is a sequence diagram illustrating an operation according to the second example embodiment of the present disclosure. Referring to FIG. 15, first, when a connection request is received from a terminal (Step S101), the base station device 100b transfers the connection request to the CPF 110 (Step S102).

The CPF 110 that has received the connection request acquires an image from the image recording unit 108 (Step S103), and specifies a transmission source (Step S104).

Next, the CPF 110 determines whether to allow the connection request with reference to a connection allowance policy and a connection management table held by the connection management unit 119 (Step S105). For example, in a case where there is a connection request from a transmission source determined as "vehicle" by the transmission source specifying unit 112, the CPF 110 allows connection if the number of connected terminals of the corresponding transmission source has not reached an upper limit defined in the connection allowance policy (Yes in Step S105). In this case, the CPF 110 transfers the connection request to the core NW (Step S106). In addition, the CPF 110 adds a terminal ID for which connection has been allowed to the connection management table of the connection management unit 119 (Step S108). Thereafter, a protocol data unit (PDU) session is established between the terminal and the core NW, and a service is started (Step S109).

On the other hand, in a case where the number of connected terminals of the corresponding transmission source has reached the upper limit defined in the connection allowance policy, the CPF 110 rejects connection (No in Step S105). In this case, the CPF 110 transmits a rejection response to the terminal via the base station device 100b (Step S107).

Thereafter, similarly, the CPF 110 updates a content of the connection management unit 119, and performs the above-described operation every time a connection request is generated to determine whether to allow the connection request. As a result, allocation of base station resources based on not the number of terminals but the number of transmission sources is implemented.

As described above, the function of determining whether to provide a service to a terminal according to the number of transmission sources can be arranged on the network side.

Third Example Embodiment

In the first and second example embodiments described above, the base station device determines whether to allow a connection request based on the type and number of transmission sources. However, the base station device may grasp an approximate round number without finely counting the type and number of the transmission sources. Next, a third example embodiment in which the transmission source specifying unit in the base station device is changed will be described in detail with reference to the drawings.

Figure 16:
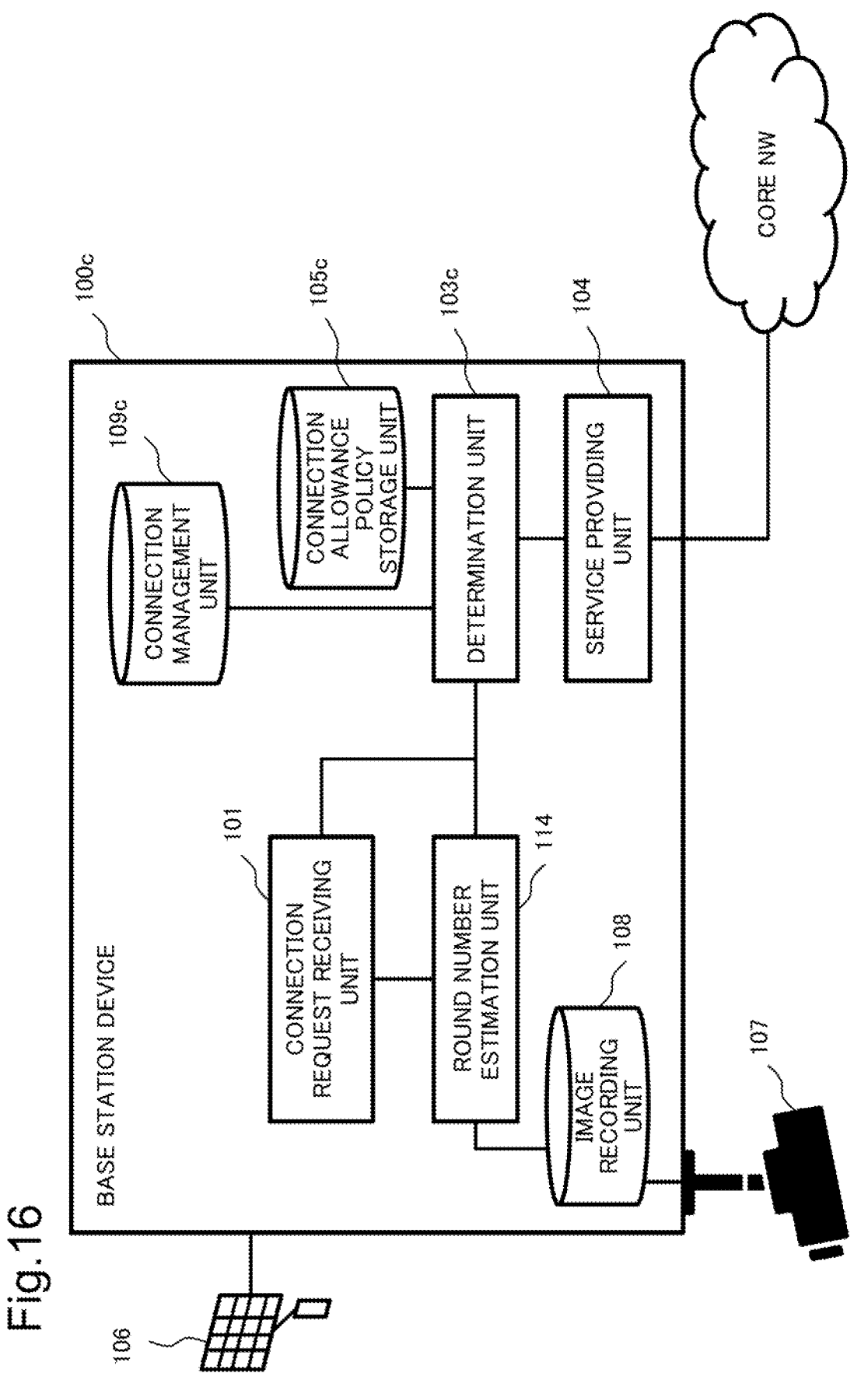
FIG. 16 is a block diagram illustrating a configuration according to a third example embodiment of the present disclosure.

FIG. 16 is a block diagram illustrating a configuration according to the third example embodiment of the present disclosure. A large difference from the configuration of the first example embodiment illustrated in FIG. 5 is that the transmission source specifying unit 102 is replaced with a round number estimation unit 114. Since the other configurations are similar to those of the first example embodiment, differences will be mainly described below.

In response to a request from a determination unit 103c, the round number estimation unit 114 estimates a round number of entities that can be transmission sources included in an image captured by a camera 107. As a method for estimating the round number of transmission sources, a face detection technology for detecting a face of a person in an image or a crowd behavior analysis technology for estimating the degree of congestion of a monitoring target area can be used. As the crowd behavior analysis technology, for example, the technology described in NPL 1 can be used.

FIG. 17 is a diagram illustrating an example of a connection allowance policy held by a base station device 100c according to the present example embodiment. In the example of FIG. 17, the connection allowance policy in which the number of terminals allowed to be simultaneously connected (simultaneous-connection-allowed number) is determined for each type of transmission source that can be a transmission entity of a connection request is illustrated. In the example of FIG. 17, the base station device 100c allows connection of up to 30 terminals for "person" and up to 20 terminals for "vehicle".

FIG. 18 is a diagram illustrating an example of a connection management table held by a connection management unit 109c of the base station device according to the present example embodiment. In the example of FIG. 18, a round number (estimated number) for each transmission source type estimated by the round number estimation unit 114 and a terminal ID for which connection is actually allowed are managed for each transmission source type. The estimated number in the connection management table is updated each time the round number estimation unit 114 estimates (recalculates) the round number for each transmission source type.

The terminal ID field is updated according to allowance of a connection request by the determination unit 103c or departure of a terminal.

Then, the determination unit 103c according to the present example embodiment determines whether to allow a connection request from a terminal based on a connection allowance policy stored in a connection allowance policy storage unit 105c. For example, it is assumed that the base station device 100c grasps that there are 10 people and eight vehicles in a predetermined area at the present time as illustrated in FIG. 18. In the following description, it is assumed that the base station device 100c operates to allow connection from one terminal for one person and allow connection from one terminal for one vehicle. In a case where a connection request is received from a terminal of a pedestrian in this state, the base station device 100c allows the connection since the simultaneous-connection-allowed number of "persons" set in the connection allowance policy illustrated in FIG. 17 is not exceeded. Thereafter, when 20 pedestrians enter the predetermined area and the image obtained from the camera 107 changes, the estimated number field of "person" in FIG. 18 becomes 30 (people). In a case where a connection request is received from a terminal of a pedestrian in this state, the base station device 100c rejects the connection since the simultaneous-connection-allowed number of "persons" set in the connection allowance policy illustrated in FIG. 17 is exceeded. Similarly, for a vehicle, the base station device 100c estimates the number of vehicles located in a predetermined area, and allows a connection request within a range not exceeding an upper limit defined in the connection allowance policy.

As described above, the present disclosure can also be embedded in a mode in which a round number of entities that can be transmission sources is estimated from an image obtained from a camera or the like, and whether to allow a connection request from a terminal is determined based on a result of the estimation. In particular, the present example embodiment can be suitably applied to a case where the predetermined area is wide or a case where the degree of congestion in the predetermined area is high and it is difficult to specify an individual transmission source. In the above example, it has been described that the base station device 100c allows connection from one terminal for one person and allows connection from one terminal for one vehicle. However, connection from any number of terminals may be allowed for each transmission source type (for example, a person or a vehicle). In this case, determination as to whether the simultaneous-connection-allowed number is exceeded can be simply performed by the following procedure. First, the base station device 100c multiplies a value of a connection-allowed number determined for each transmission source type by a round number for each transmission source type estimated by the round number estimation unit 114 to calculate the simultaneous-connection-allowed number. Then, by comparing the simultaneous-connection-allowed number with the number of terminal IDs actually allowed to be connected recorded in the connection management table, the base station device 100c determines whether the simultaneous-connection-allowed number is exceeded.

While the invention has been particularly shown and described with reference to exemplary embodiments thereof, the invention is not limited to these embodiments, and further modifications, substitutions, and adjustments may be made without departing from the basic technical idea of the present disclosure. For example, the device configuration, the configuration of each element, and the expression form of data and the like illustrated in the drawings are examples for assisting the understanding of the present disclosure, and the present disclosure is not limited to the configurations illustrated in the drawings. For example, in the second example embodiment described above, it has been described that the function of determining whether to provide a service to a terminal is arranged in the CPF of the 5G core NW, but a node independent of the CPF may be caused to perform processing corresponding to the CPF of the second example embodiment. Instead of the above configuration, a function corresponding to the CPF of the second example embodiment may be added to an access and mobility management function (AMF) that performs access and mobility management in the CPF.

In the above example embodiments, an upper limit of the number of connected terminals is determined for each terminal type by using the connection allowance policy, and it is determined whether to allow a new connection request. However, the upper limit of the number of connected terminals may be uniformly set regardless of the terminal type. It is also possible to set an upper limit of the number of connected terminals for each user attribute (a contract type with a telecommunication company or the like) in the connection allowance policy and perform determination according to the user attribute. Furthermore, the upper limit of the number of connected terminals may be changed in consideration of a capability of a base station device as a base station, characteristics of an installation location, a time zone, and the like, in addition to the connection allowance policy. For example, it is also possible to limit the number of connected terminals according to a transmission source described in the above example embodiments only during rush hours in the morning and evening, and not to limit the number of connected terminals in other time zones.

In addition, it is possible to adopt a mode in which a connection request is allowed within a range in which the number of transmission sources and the connection request from the terminal are consistent with each other, without using the connection allowance policy. For example, it is possible to adopt a configuration in which connection requests from 1×n terminals are allowed in a case where the number of transmission sources captured by the camera is one, and the number of terminals for which connection requests are allowed increases as the number of transmission sources increases.

For example, in the above example embodiments, the camera is used as a device for specifying a transmission source, but a configuration in which a transmission source is specified using a sensor such as light detection and ranging (LiDAR) instead of the camera can also be adopted. In a case where a database or the like that enables inference of a type or the like of a transmission source from an ID or the like of a terminal is available, the type of a transmission source may be specified using the database or the like. In a case where a connection request from a terminal includes pieces of information capable of specifying the type of a transmission source, it is possible to adopt a configuration in which the type of a transmission source is specified using these pieces of information.

In addition, in the above example embodiments, it has been described that selection of a connection request is performed on a first-come basis in a case where a number of connection requests exceeding the limit are received from the same transmission source. However, priority may be given to a connection request according to a predetermined rule. For example, it is possible to adopt a configuration in which a connection request to be allowed is selected based on a service request from a terminal or a content of a host application. In a case where information such as a quality of service (QoS) flow ID and a class of service (CoS) is set for communication with a terminal, it is possible to adopt a configuration in which a connection request to be allowed is selected based on these pieces of information. By adopting such a configuration, it is possible to prioritize a terminal with a higher priority.

Further, in the above example embodiments, it has been described that whether to allow a connection request from a terminal is determined, but the base station device may be configured to determine whether to provide a service to the terminal based on whether the number of transmission sources is consistent with the connection request from the terminal after allowing the connection request. In this case, the above-described service providing unit provides a service to the terminal based on the determination result.

In the above example embodiments, the base station device determines whether to allow a connection request from a terminal based on a state of a transmission source. However, a service providing staff may be involved in the determination. For example, it is also possible to adopt a configuration in which a base station device notifies a service providing staff of a state of a transmission source, and the service providing staff determines whether to allow a connection request from a terminal and instructs the base station device.

In a case where it is determined not to allow the connection request from the terminal based on the state of the transmission source, the base station device may make a notification to the service providing staff. Further, the state of the transmission source and a video captured by the camera can be added to the notification. The service providing staff can use these pieces of data to review the connection allowance policy. In addition, it is also possible to perform detailed analysis of a terminal connected with a malicious intention and an owner of the terminal by using these notifications. Furthermore, in a case where it is determined not to allow the connection request from the terminal, the base station device may transmit a similar notification to a terminal possessed by a surveillance staff or the like at the site. As a result, it is possible to cause the surveillance staff or the like to check the terminal connected with a malicious intention and the owner of the terminal.

Due to the characteristic of the present disclosure that whether a transmission source and a connection request from a terminal match each other is checked, it is preferable that a geographical range (area) in which the base station device can receive the connection request and a geographical range (area) in which the transmission source can be specified match each other as much as possible. In a case of using a camera as means configured to specify a transmission source, the present disclosure can be suitably applied to a base station that provides a service in FR2, which is also called a millimeter wave band of 5G. It is a matter of course that, in view of the essence of the present disclosure, the base station device to which the present disclosure is applicable is not limited to the above-described 5G base station. For example, the present disclosure can also be applied to terminal connection management in an access point of a wireless local area network (LAN) or a small base station called a femtocell. If a large number of cameras can be installed, the present disclosure can also be applied to terminal connection management in a base station device having a larger service area. For example, in a case where a wireless LAN service is provided inside a bullet train, an airplane, or a store or satellite office (including a shared office), it is also possible to adopt a configuration in which the inside of the bullet train, the inside of the airplane, or the inside of the store or satellite office is monitored to estimate a state of a transmission source, and it is determined whether to provide the service. By adopting such a configuration, it is possible to adopt a quantity-based rate system according to the number of terminals when providing a communication service inside a store or a satellite office.

Figure 19:
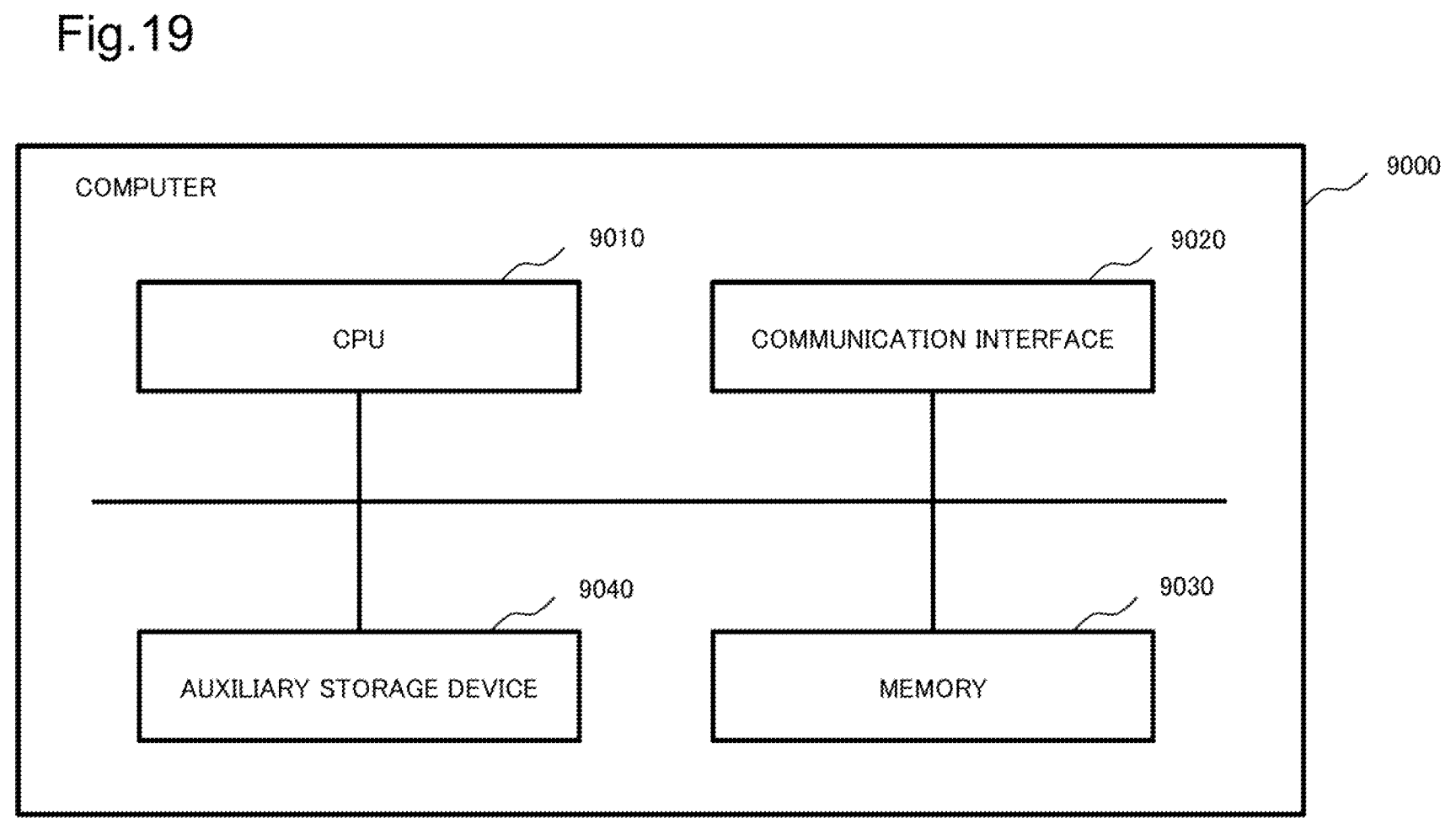

In addition, the procedure described in the above example embodiments can be implemented by a program for causing a computer (9000 in FIG. 19) functioning as the base station device and the CPF to implement the functions as these devices. Such a computer is exemplified as a component including a central processing unit (CPU) 9010, a communication interface 9020, a memory 9030, and an auxiliary storage device 9040 in FIG. 19. That is, it is sufficient if the CPU 9010 of FIG. 19 executes a transmission source program and a connection availability determination program or serves as the CPF.

That is, each unit (processing means and function) of the above-described base station device can be implemented by a computer program that causes a processor mounted in each of these devices to perform each of the above-described processings by using the hardware.

Some or all of the above example embodiments can also be described as the following Supplementary Notes, but are not limited to those notes.

[Supplementary Note 1]

(See the base station device according to the first aspect)

[Supplementary Note 2]

In the base station device, the means configured to estimate the state of the transmission source can estimate the state of the transmission source by counting a number of transmission sources located in the predetermined area by a sensor that detects an object located in the predetermined area, and the means configured to determine whether to allow the connection request from the terminal can determine whether to allow the connection request from the terminal based on whether the number of transmission sources is consistent with the connection request from the terminal.

[Supplementary Note 3]

In the base station device, the means configured to estimate the state of the transmission source of the connection request can count the number of transmission sources of the connection request based on a change in a figure located in the predetermined area.

[Supplementary Note 4]

In the base station device, whether to allow the connection request from the terminal can be determined based on whether a number of connection requests received from the terminal within a predetermined time is within a predetermined range with respect to the number of transmission sources of the connection request.

[Supplementary Note 5]

In the base station device, a number of connection requests within the predetermined range among the connection requests received from the terminal within the predetermined time can allowed, and a connection request from the terminal after exceeding the predetermined range can be rejected.

[Supplementary Note 6]

In the base station device, a connection request to be allowed can be selected from among the connection requests received within the predetermined time based on a terminal type included in the connection request.

[Supplementary Note 7]

In the base station device, a connection request to be allowed can be selected from among the connection requests received within the predetermined time based on a content of a service request from the terminal.

[Supplementary Note 8]

The base station device can include:

means configured to receive a connection request from a terminal;

means configured to monitor a predetermined area and estimate a state of a transmission source of the connection request; and means configured to provide a service to the terminal that has transmitted the connection request based on the state of the transmission source of the connection request.

[Supplementary Note 9]

A part of the functions of the base station device can be arranged on the network side, and equivalent functions can be implemented in a network node.

[Supplementary Note 10]

(See the method for providing a service according to the second aspect)

[Supplementary Note 11]

(See the program according to the third aspect)

The modes of Supplementary Notes 9 to 11 can be extended similarly to Supplementary Notes 2 to 8 like Supplementary Note 1.

The disclosure of PTLs described above is incorporated herein by reference. Within the range of the entire disclosure (including the claims) of the present invention, it is possible to change and adjust the example embodiments or examples further based on the basic technical idea thereof. In addition, various combinations or selections (including partial deletions) of various disclosed elements (including the elements of the claims, the elements of the example embodiments or examples, the elements of the drawings, and the like) can be made within the range of the disclosure of the present invention. That is, it is a matter of course that the present invention includes various modifications and corrections that can be made by those skilled in the art in accordance with the entire disclosure including the claims and the technical idea. In particular, for numerical ranges set forth herein, any numerical value or sub-range included within the range should be construed as being specifically described, even if not stated otherwise.

REFERENCE SIGNS LIST

100, 100a, 100b, 100c base station device
101, 101a, 111 connection request receiving unit
102a monitoring unit
102, 112 transmission source specifying unit
103, 103a, 113 determination unit
104, 104a service providing unit
T1 to T6 terminal
105, 105c, 115 connection allowance policy storage unit
106 antenna
106b Radio Unit (RU)
107 camera
108 image recording unit
109, 109c, 119 connection management unit

110 CPF
114 round number estimation unit
116 base station database (base station DB)
120 UPF
9000 computer
9010 CPU
9020 communication interface
9030 memory
9040 auxiliary storage device

What is claimed is:

1. A base station device comprising:
at least one memory configured to store instructions; and
at least one processor configured to execute the instructions to:
    receive a connection request from a terminal;
    monitor a predetermined area and estimate a state of a transmission source of the connection request by counting a number of transmission sources present in the predetermined area by a sensor, the sensor detecting an object present in the predetermined area;
    determine whether to allow the connection request from the terminal based on whether the number of transmission sources is consistent with the connection request from the terminal; and
    provide a service to the terminal for which the connection request has been allowed by the determination.

2. The base station device according to claim 1, wherein the at least one processor is further configured to execute the instructions to:
    count the number of transmission sources of the connection request based on a change in a figure present in the predetermined area.

3. The base station device according to claim 1, wherein the at least one processor is further configured to execute the instructions to:
    determine whether to allow the connection request from the terminal based on whether a number of connection requests received from the terminal within a predetermined time is within a predetermined range with respect to the number of transmission sources of the connection request.

4. The base station device according to claim 3, wherein the at least one processor is further configured to execute the instructions to:
    allow a number of connection requests within the predetermined range among connection requests received from terminals within the predetermined time, and reject a connection request from the terminal after exceeding the predetermined range.

5. The base station device according to claim 1, wherein a connection request to be allowed is selected from among the connection requests received within the predetermined time further based on a terminal type included in the connection request.

6. The base station device according to claim 1, wherein a connection request to be allowed is selected from among the connection requests received within the predetermined time further based on a content of a service request from the terminal.

7. A method for providing a service, the method comprising:
    receiving a connection request from a terminal;
    monitoring a predetermined area and estimating a state of a transmission source of the connection request by counting a number of transmission sources present in the predetermined area by a sensor, the sensor detecting an object present in the predetermined area;
    determining whether to allow the connection request from the terminal based on whether the number of transmission sources is consistent with the connection request from the terminal; and
    providing the service to the terminal for which the connection request has been allowed by the determination.

8. A non-transitory program recording medium with a program recorded on the medium, the program causing a base station device to perform:
    processing of receiving a connection request from a terminal;
    processing of monitoring a predetermined area and estimating a state of a transmission source of the connection request by counting a number of transmission sources present in the predetermined area by a sensor, the sensor detecting an object present in the predetermined area;
    processing of determining whether to allow the connection request from the terminal based on whether the number of transmission sources is consistent with the connection request from the terminal; and
    processing of providing a service to the terminal for which the connection request has been allowed by the determination.

* * * * *